United States Patent [19]

Baylor

[11] 4,030,782

[45] June 21, 1977

[54] CRAWLER TRACTOR TRACK CHAIN DRIVE ASSEMBLY

[75] Inventor: John Merlin Baylor, Bettendorf, Iowa

[73] Assignee: J. I. Case Company, Racine, Wis.

[22] Filed: June 25, 1976

[21] Appl. No.: 699,703

[52] U.S. Cl. .................................... 305/57; 74/229; 74/247

[51] Int. Cl.[2] .......................................... B62D 5/20

[58] Field of Search ................. 305/57, 46; 74/247, 74/229

[56] References Cited

UNITED STATES PATENTS

| | | | |
|---|---|---|---|
| 3,563,614 | 2/1971 | Parks | 305/57 X |
| 3,567,294 | 3/1971 | Simpson et al. | 305/57 |
| 3,680,929 | 8/1972 | Hnilicka et al. | 305/57 |
| 3,887,244 | 6/1975 | Haslett et al. | 305/57 |
| 3,897,980 | 8/1975 | Dester et al. | 305/57 |
| 3,948,573 | 4/1976 | Baylor | 305/57 |

*Primary Examiner*—Robert B. Reeves
*Assistant Examiner*—John P. Shannon
*Attorney, Agent, or Firm*—Arthur J. Hansmann

[57] ABSTRACT

A crawler tractor track chain drive assembly including a sprocket and a track chain having pairs of links and a track plate and connectors extending between the links and spaced from the plate. An elastomeric member is disposed in the space between the connectors and the plate and extends to be engaged by the sprocket in the driving of the chain, and thereby attenuate noise in the contact between the sprocket and the chain.

8 Claims, 4 Drawing Figures

10
11
12
13
14
15
16
17
18
19
21
22
23
24
26
27
28
29
31
32
33
34
36
37
A
R
r
C

CRAWLER TRACTOR TRACK CHAIN DRIVE ASSEMBLY

This invention relates to a crawler tractor track chain drive assembly of the type which includes a sprocket and a track chain driven by the sprocket for movement of the tractor over the ground.

BACKGROUND OF THE INVENTION

The prior art is already aware of various arrangements of crawler tractor track chain drive assemblies. The prior art includes arrangements wherein provision is made for attenuating or reducing the noise usually accompanying the drive engagement between the sprocket and the chain itself. That is, the sprocket and chain are made of metal, and when the sprocket engages the chain bushings or the like, there is creation of noise, and there is also an undesirable impact between the metal parts and this causes a certain wearing and loading between the contacting parts, such as the sprocket teeth and the chain bushings. The prior art has recognized this problem, and it has presented certain constructions which are intended to solve the problem, such as the arrangements shown in U.S. Pat. Nos. 3,887,244 and 3,897,980 wherein an elastomeric member is attached to the track chain for noise attenuation. Other prior art examples of the use of elastomeric members attached to track chains, but in this instance as mid-pitch drive members, are shown in U.S. Pat. Nos. 3,563,614 and 3,567,294 and 3,680,929. However, in this latter group of patents, the function of the elastomeric member is for the drive engagement between the sprocket and the chain, rather than having the elastomeric member provided for the sole purpose of noise attenuation. Also, in all of the aforesaid examples of prior art, the elastomeric member is secured to the track chain track plate, and bolts or screws are utilized to secure the elastomeric members to the track plates. With these arrangements, the usual and desired arrangement of permitting dirt to move out of the interior of the track chain is impeded if not completely hampered and eliminated. Also, where screws and bolts are required to pass through the track plate and the elastomeric member, special parts and special machinings are necessarily required to achieve that. Still further, where the prior art has the elastomeric member disposed intermediate the chain bushings, it hampers the removal of dirt from the chain, since the usual opening in the chain track plate is closed off by the elastomeric member and dirt can not pass out the opening.

Accordingly, the present invention provides an improvement upon the prior art, and, more specifically, it overcomes the aforementioned problems and deficiencies of the prior art.

Still further, the present invention provides a track chain assembly which minimizes the noise commonly generated by contact between the sprocket and the track chain, and the present invention does so by means of providing an elastomeric member directly between the track chain bushing and the track plate and with the member available for initial engagement by the sprocket teeth prior to the time that the sprocket teeth engage the track chain bushing.

Still further, the present invention provides a track chain assembly with the noise attenuating elastomeric member mentioned above, and with the entire arrangement being such that provision is still retained for the passage of dirt from the interior of the track chain and through the usual opening provided in the track plate, and the incorporated elastomeric member does not block the track plate opening and therefore does not impede the removal of dirt from the interior of the track chain.

Still further, the present invention provides a track chain assembly arranged with a noise attenuating elastomeric member which is secured to the track chain without the requirements of any bolts or screws, and which can be readily and easily replaced simply by removal of the track plate. Still further, the present invention provides an elastomeric member which serves to attenuate noise in the assembly of a track chain and sprocket drive, and the present invention provides the arrangement such that any presently existing or prior art assembly can accommodate the elastomeric member and arrangement of this invention, without requiring any special parts of machining or the like.

Still further, the present invention provides a crawler tractor track chain drive assembly which has an elastomeric member for attenuating noise and with the assembly also being arranged so that dirt can pass from the interior of the track chain itself, and the elastomeric member does not block or impede the passage of the dirt and therefore there is no change in the pitch between the sprocket and the chain which might otherwise occur due to tightening of the chain because of accumulation of dirt thereon.

Other objects and advantages will become apparent upon reading the following description in light of the accompanying drawings.

DETAILED DESCRIPTION OF THE PREFERRED EMBODIMENT

Figures 1, 2, 3, 4:
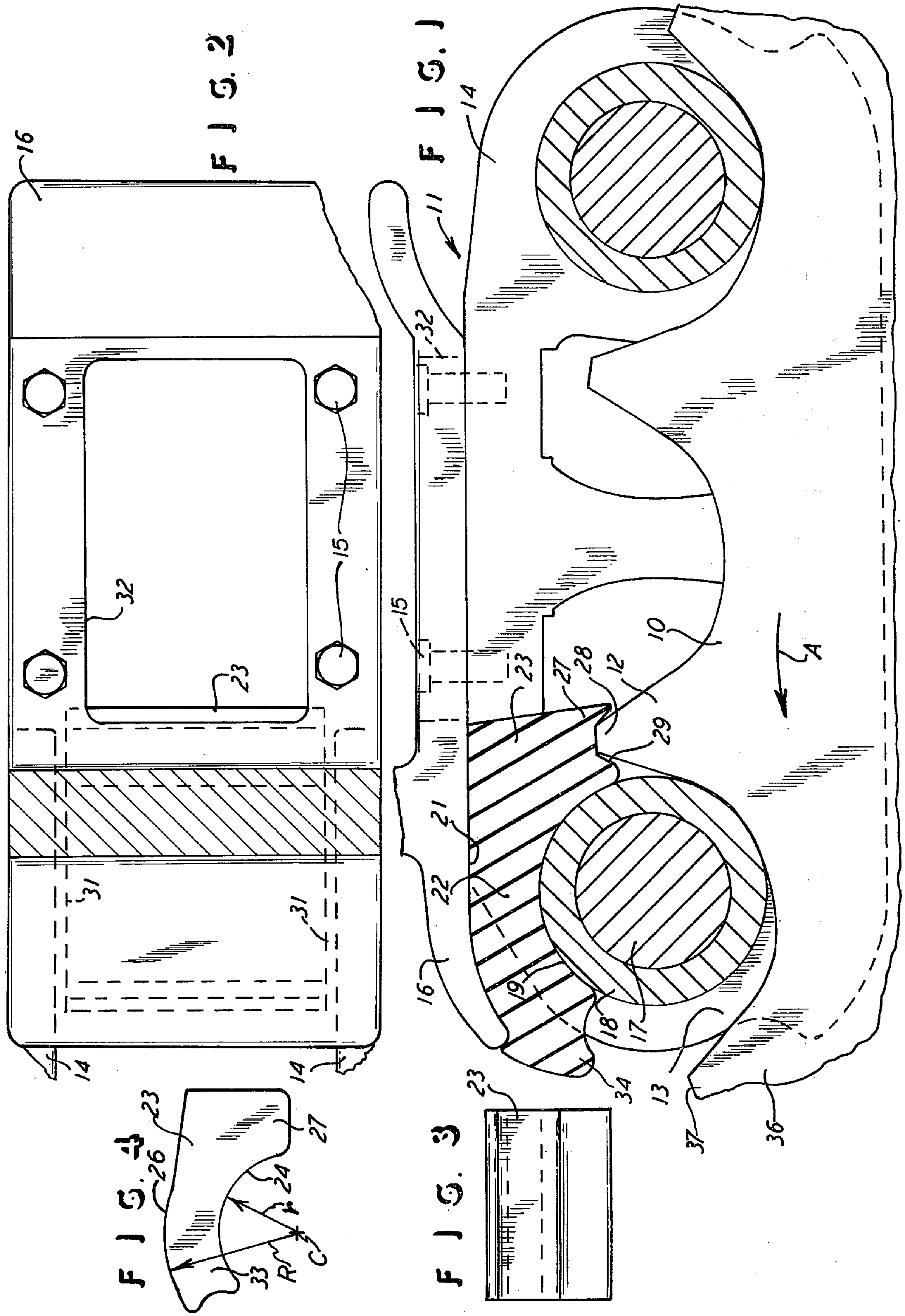
FIG. 1 is a longitudinal sectional view of a preferred embodiment of the track chain assembly of this invention.
FIG. 2 is a top plan view of FIG. 1, with certain links removed and other links added thereto.
FIG. 3 is an end elevational view of the elastomeric member shown in FIG. 1, but on a reduced scale.
FIG. 4 is a side elevational view of the elastomeric member shown in FIG. 3.

The drawings show the crawler tractor track chain assembly which has the usual sprocket 10 suitably rotatably mounted on the tractor, in any conventional manner, for driving the chain generally designated 11. The sprocket 10 includes the radiallyextending teeth 12 and it has the spaces 13 between every two teeth 12, all in the usual and well-known arrangement of a sprocket.

The track chain 11 includes the laterally-disposed and spaced-apart links 14 which are disposed in pairs across the width of the chain 11, and the usual track plate 16 is suitably connected to the links 14, such as by the screws 15 extending through the plate 16 and into the links 14, all in the wellknown and conventional arrangement. Thus, the plate 16 spans the spaced-apart pairs of links 14, and of course the ends of the links 14 are overlapped and are interconnected by means of connectors which are shown to be in the form of pins 17 and cylindrical bushings 18 extending over the pins 17, and the pins 17 extend between the laterally spaced-apart links 14, all for connecting the links 14 in end-to-end and articular relationship, as in any conventional track chain.

The bushings 18 are cylindrical and therefore present the exterior arcuate surfaces 19 which are spaced from the undersurface 21 of the track plate 16 to thereby present a space designated 22 between the connectors and the track plate 16. An elastomeric block-shaped member 23, made of a rubber or like resilient material, is snugly disposed in the space 22 and in contact with the bushing surface 19 and the plate undersurface 21 to be retained in the position shown in FIGS. 1 and 2. Thus, securing the plate 16 to the links 14, as described above and as shown in the drawings, will cause the elastomeric member 23 to be compressed between the plate 16 and the bushing 18 to be slightly compressed therebetween, since the elastomeric member 23 has its arcuate surface 24 conformed to the bushing exterior arcuate surface 19, and the elastomeric member has its upper surface 26, as viewed in these drawings, in full and snug contact with the plate undersurface 21.

That is, with reference to FIGS. 1 and 4, the elastomeric member 23 has its arcuate surface 24 generated by a radius r about a center C, and it has its outer surface 26 also on a radius R, and thus the difference between the two radii presents the thickness of the elastomeric member 23 which occupies the space 22, and that thickness, in the free-body position of the elastomeric member 23, is slightly greater than the distance or space between the bushing surface 19 and the plate undersurface 21, all for compressing the elastomeric member 23 in the space 22 and thereby securely holding the elastomeric member 23 in the shown position and to have it available for transmitting forces between the bushing 18 and the plate 16.

Also, the elastomeric member 23 has an extended portion 27 which is shown further wrapped around or conformed to the bushing surface 19 and extended toward the central portion of the plate 16 and actually into the position for engagement by the tip 28 of the sprocket tooth 12, as shown in FIG. 1. Thus the elastomeric portion 27 is actually engaged by the tooth tip 28 at a time prior to the engagement between the sprocket tooth 12 and the bushing 18, and FIG. 1 shows an indentation designated 29 and on the elastomeric portion 27 and created by the presence of the tooth tip 28 embedded in the elastomeric member portion 27.

With that arrangement, the sprocket 10 engages the elastomeric member 23 before it engages that adjacent bushing 18, and thus the advantages of noise attenuation, and like advantages mentioned at the outset of this application, are achieved.

The drawings further show that the elastomeric member 23 is secured in the assembly without the requirement for any fastener such as bolts, screws, or the like, and it is simply secured therein by being compressed between the bushing 18 and the plate 16, and also the elastomeric member 23 is readily accessible for replacement, when and if replacement is needed. Still further, any conventional track chain can be provided with the elastomeric members 23 which would be presented over each of the track chain bushings 18, as shown in FIG. 1, and the prior art assembly only requires that the track plate 16 be removed for the inclusion of the elastomeric member 23.

FIG. 2 shows that the elastomeric member 23 extends substantially between and across the full spacing between the chain links 14, by virtue of the extent of the elastomeric member sides 31 which are disposed immediately adjacent the inner edges of the chain links 14. Also, FIGS. 1 and 2 show that the track plate 16 is provided with its usual dirt passageway opening designated 32, but the elastomeric member 23 in no way is disposed over the opening 32 and it therefore does not hinder the movement of dirt from the interior of the chain and through the opening 32. Accordingly, the elastomeric members 23 extend from said bushings 18 and to the rearward direction with regard to the movement of the track chain 11, such that the elastomeric member portion 27 extends in the direction of the length of the chain 11 to be disposed to be engaged by the sprocket teeth 12, as shown and described. Also, the elastomeric member 23 is provided with the arcuate portion 33 defined between the arcuate surfaces 24 and 26, so that the elastomeric member portion 33 is available for conforming to the bushing 18 and the curved configuration of the surface 21 of the track plate 16. Still further, with the arrangement described, no wear plate is required on the elastomeric member to be interposed between the sprocket 10 and the elastomeric member, and the elastomeric member 23 is firmly and sturdily supported for the operation desired and for long life. Also, the member 23 is provided with a forwardly rotating end portion 34 which projects concentrically with the bushing 18 and into the path of the sprocket tooth 36 to be engaged and compressed by the tooth tip 37. Thus, with the sprocket 10 rotating forwardly in the direction of the arrow A, first the member tip 34 was contacted by the tip 37, and then the member tip 27 is contacted by the tip 28 when the parts reach the FIG. 1 position.

What is claimed is:

1. A crawler tractor track chain drive assembly comprising a drive sprocket having teeth and spacings therebetween, a track chain including a plurality of track chain links disposed in pairs in end-to-end relation along said track chain and with each of said pairs being two of said chain links laterally spaced apart from each other across said chain, a track plate removably attached to each of said pairs of said links and extending thereover, a plurality of connectors extending laterally of said chain and between said pairs of said links for articularly connecting said pairs of said links together in a chain arrangement, each of said connectors being spaced from an adjacent one of said plates and being disposed toward said sprocket and received in said spacings for driving engagement with said teeth, and an elastomeric member snugly disposed in the space between said connector and said plate and thereby being secured in a fixed position on said track chain and extending beyond said connector in the direction of the length of said chain to be disposed to be engaged by said sprocket teeth and thereby minimize noise created by engagement of said sprocket with said chain.

2. The crawler tractor track chain drive assembly as claimed in claim 1, wherein said elastomeric member is of a free-body dimension, in the direction between said connector and said track plate, which is greater than the corresponding dimension of said space, for compressing said elastomeric member between said connector and said track plate.

3. The crawler tractor track chain drive assembly as claimed in claim 1, wherein said elastomeric member is secured to said track chain by being compressed between said connector and said plate and thereby being free of any fastener means such as bolts and screws.

4. The crawler tractor track chain drive assembly as claimed in claim 1, wherein said track plate has an opening therethrough in the center portion of said plate, and said elastomeric member is located to one side of said opening to thereby leave said opening clear for the passage of dirt through said opening.

5. The crawler tractor track chain drive assembly as claimed in claim 4, wherein said elastomeric member includes a portion extending away from said connector and said space, and toward said opening, to be exposed beyond said connector and to said sprocket teeth, for engagement by said teeth prior to said teeth engaging said connector.

6. The crawler tractor track chain drive assembly as claimed in claim 1, wherein said connector includes a cylindrical bushing extending between each said pair of links, and said elastomeric member has an arcuate surface conformed to the exterior arcuate surface of said bushing to be snug with said bushing and extend partly therearound.

7. The crawler tractor track chain drive assembly as claimed in claim 1, wherein said elastomeric member is of a length to extend in said space substantially fully between each said pair of said links.

8. The crawler tractor track chain drive assembly as claimed in claim 1, wherein said elastomeric member includes opposite end tips disposed extended toward opposite sides of said connector and in the direction of the said teeth of said sprocket to be engaged by said teeth upon movement of said chain relative to said sprocket.

* * * * *